United States Patent [19]

Dick et al.

[11] Patent Number: 5,545,033

[45] Date of Patent: Aug. 13, 1996

[54] ASYMMETRIC OXYGEN/FUEL BURNER

[75] Inventors: Sami Dick, Le Chesnay; Patrick Recourt, Marcoussis; Serge Laurenceau, Versailles, all of France

[73] Assignee: L'Air Liquide, Societe Anonyme Pour L'Etude et L'Exploitation Des Procedes Georges Claude, Paris, France

[21] Appl. No.: 345,844

[22] Filed: Nov. 28, 1994

[30] Foreign Application Priority Data

Nov. 30, 1993 [FR] France ................................ 93 14305

[51] Int. Cl.⁶ ....................................................... F23C 5/08
[52] U.S. Cl. ........................... 431/181; 431/188; 431/190
[58] Field of Search ................................ 431/181, 8–10, 431/190, 187, 188; 239/558

[56] References Cited

U.S. PATENT DOCUMENTS

| | | | |
|---|---|---|---|
| 4,439,137 | 3/1984 | Suzuki et al. | 431/8 |
| 4,519,321 | 5/1985 | Poll et al. | 239/295 X |
| 4,911,637 | 3/1990 | Moore et al. | 431/181 X |
| 4,969,814 | 11/1990 | Ho et al. | 431/8 |
| 5,329,866 | 7/1994 | La Rue | 431/181 X |

Primary Examiner—Larry Jones
Attorney, Agent, or Firm—Curtis, Morris & Safford, P.C.

[57] ABSTRACT

The oxygen/fuel burner contains at least one first tubular component (2) conveying the oxidant and at least one second tubular component (3), for injecting the fuel into the oxidant flow, arrangd asymmetrically with respect to the first (2) so that the mixing region upstream of the flame contains a part where the ratio of the oxidant to the fuel is less than the soichiometric value.

5 Claims, 1 Drawing Sheet

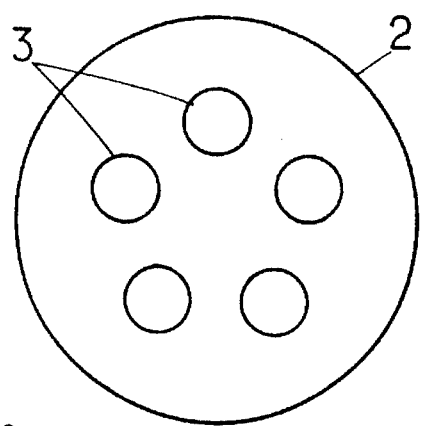
FIG.:1
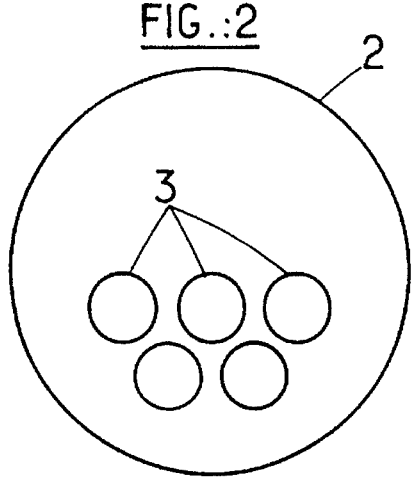
FIG.:2
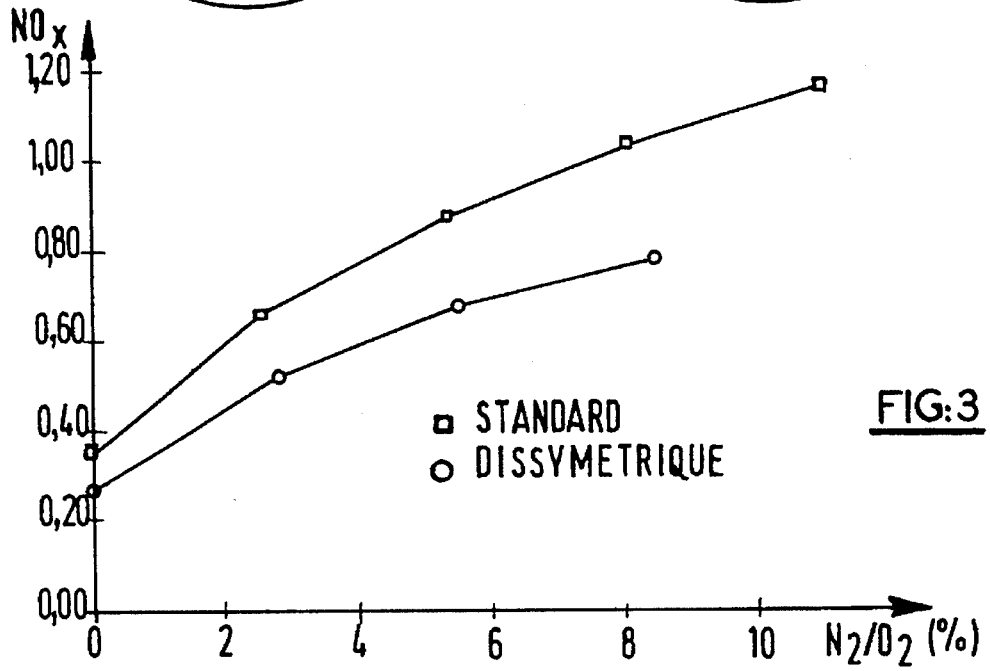
FIG:3
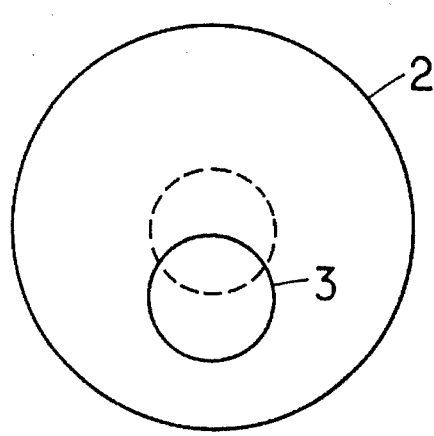
FIG.:5
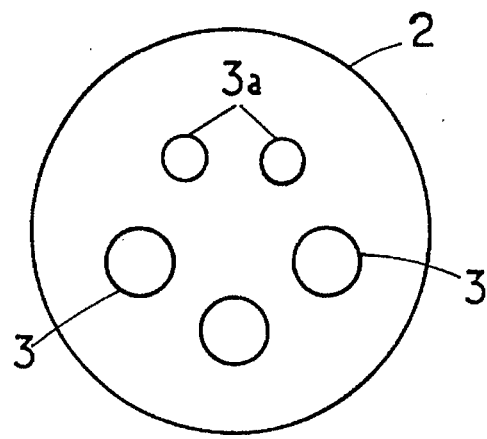
FIG.:4

ASYMMETRIC OXYGEN/FUEL BURNER

The present invention relates to oxygen-fuel burners intended to be arranged in a furnace wall, such as a glass furnace, and more particularly to low-impulse burners, that is to say those operating with a relatively low gas outlet velocity.

The tightening in emission standards for pollutants, especially in the glass industry, has encouraged manufacturers to use burners suitable for combustion with oxygen (with oxidizing mixtures containing a high $O_2$ content of between 85 and 100%).

The problem has been presented of improving the behaviour of such burners and especially of decreasing the emission of nitrogen oxides during use of oxygen of moderate purity, such as can be obtained, for example, in a separation of air by adsorption of the type known as VSA and/or of a natural gas containing nitrogen, of the Gröningen type, for example, in Europe.

It has found that this decrease can be very substantially obtained by an asymmetric distribution of the total fuel gas delivery into the oxygen flow conveyed by the burner.

More precisely, if it is considered that, in the normal operation of the burner, the ratio of the total deliveries of oxygen and fuel gas is stoichiometric or substantially so, a main specific feature of a burner according to the invention described herein lies in the distribution of the gas deliveries in the same cross-section of the burner, upstream of the flame, such that, in at least part of this section, the ratio of the oxygen delivery to the gas delivery is markedly below the stoichiometric value.

It has been surprisingly observed that this asymmetry in the distribution of the deliveries, upstream of ignition of the flame, provides and retains a region in which the content of nitrogen oxides is reduced with respect to the case where the distribution of the deliveries would be uniform or substantially so throughout the section.

It may also be noted that the asymmetric configuration which produces a region of substoichiometry in the flame is also suitable when it is desired locally to obtain a reducing atmosphere, for example above a bath of glass.

Other characteristics and advantages of the present invention will emerge from the following description of embodiments, given by way of illustration but without any implied limitation, made with respect to the appended drawings, in which:

FIG. 1 schematically represents a front view of a known burner, with symmetric distribution of the fuel gas deliveries;

FIG. 2 is a similar view of a first embodiment of a burner according to the invention;

FIG. 3 is a comparison diagram representing the variations in the nitrogen oxide emissions with the burners according to FIG. 1 and 2; and FIGS. 4 and 5 represent two other embodiments of burners according to the invention.

A burner according to the invention can be constructed in the way described in French Patent Application No. 93 11739. It can thus contain three main parts, i.e. a glory hole block made of refractory material, a metal burner body secured in a removable way on the glory hole, to the side of which is connected the oxidant line, and at least one fuel injection pipe, attached in a removable and leakproof way to the body, the fuel consequently arriving at the rear of the burner.

FIG. 1 illustrates the case where the fuel injection pipe contains one or more pipes 3 distributed angularly in the oxygen flow, or more precisely in the flow of oxidant with an $O_2$ content greater than 90%, which moves in the tubular casing 2 constituting an extension of the burner body.

In FIG. 2, which illustrates a first embodiment of the invention, it is seen that the pipes 3 conveying the fuel gas (reducing agent), instead of being regularly distributed in the casing 2 where the oxidant is moving, are concentrated in a part of the section, in this case on a lower half of the section of the tubular casing 2. It is consequently understood that, in such a case, the oxidant/reducing agent ratio will be markedly below the stoichiometric ratio at the outlet of the pipes 3, upstream of ignition of the flame.

FIG. 3 illustrates the diagrams of the amounts of standardized nitrogen oxides (in kg/MW), on the ordinate, with respect to the nitrogen content, as a percentage of the oxygen used, on the abscissa, for a 1 MW burner burning natural gas having a nitrogen content of approximately 2.5%, the natural gas and oxygen deliveries being respectively approximately 100 $Sm^3/h$ and 200 $Sm^3/h$. A significant lowering in the $NO_x$ emissions is observed with an asymmetric distribution of 5 natural gas pipes according to FIG. 2 with respect to the rotationally symmetric distribution ("standard") of FIG. 1.

Other asymmetric configurations can be devised. For example, it is possible, as shown in FIG. 4, which represents an angular distribution of pipes 3 analogous to that of FIG. 1, to give different cross-sections to the pipes 3 and 3a, now differentiated, conveying the fuel gas. It is also possible, with a single fuel pipe, to highly offset it in the casing 2 conveying the oxidant, as represented in FIG. 5.

Other embodiments can be devised by those skilled in the art without departing from the scope of the invention as defined by the claims below.

We claim:

1. An oxygen/fuel burner, comprising an oxygen conduit for supplying oxygen and having an axis, and a fuel conduit disposed within and surrounded by the oxygen conduit and having an outlet for ejecting fuel into the oxygen supplied by the oxygen conduit, the outlet being offset from the axis of the oxygen conduit, whereby a mixing region is established downstream of the outlet of the fuel conduit in which the oxygen/fuel ratio is less than stoichiometric.

2. An oxygen/fuel burner, comprising a cylindrical oxygen conduit having an axis, and at least two fuel conduits disposed within and surrounded by the oxygen conduit and each having an outlet section, the fuel conduits being arranged such that the total outlet sections are asymmetric relative to the axis of the oxygen conduit to generate a locally reducing atmosphere.

3. The burner of claim 2, wherein all of the fuel outlet sections are disposed to one side relative to a diameter of the oxygen passage.

4. The burner of claim 2, wherein the outlet sections are angularly spaced around the axis.

5. The burner of claim 2, wherein the outlet sections exhibit different cross-sectional areas.

* * * * *